UNITED STATES PATENT OFFICE 2,229,880

ABRASIVE ARTICLE AND METHOD OF MAKING SAME

Hugh V. Allison, Fairfield, Conn., assignor to The Allison Company, Bridgeport, Conn., a corporation of Connecticut No Drawing. Application January 25, 1940, Serial No. 315,575

5 Claims. (Cl. 51—298)

This invention relates to new and useful improvements in abrasive articles and methods of making the same.

The objects and advantages of the invention will become apparent from a consideration of the following detailed description wherein satisfactory embodiments of the invention are disclosed. However, it is to be understood that the invention is not limited to the details disclosed, but includes all such variations and modifications as fall within the spirit of the invention and the scope of the appended claims.

The advantages of organic bonded abrasive articles in the art of grinding and cutting have long been known. One of the longest used and most satisfactory bonds for abrasive articles is natural rubber. While this material has many advantages when used as a bond for abrasives, it also has properties rendering it not entirely satisfactory for such purpose. Rubber bonds are not entirely satisfactory particularly when the abrasive articles are subjected to heat or are used in connections where relatively high heats are developed or when the articles will be subjected to contact with oil during use.

Outstanding among the disadvantages of natural rubber as a bond for abrasives is the comparative low softening point of rubber and the rapid loss of tensile strength at elevated temperatures. Also natural rubber exhibits little resistance to the action of oil. With the development of modern abrasive cutting, milling, and grinding the use of oil and water emulsions as cooling agents in such operations has become common. The oil in these coolants has a detrimental effect on rubber bonded abrasive articles and the effect is intensified at the elevated temperatures developed during cutting and grinding operations.

While in recent years the development of oil resistant artificial rubbers has progressed and been intensified, most of such artificial rubbers are unsatisfactory as binders for abrasive articles because of their physical properties following curing or because of processing difficulties. However, with the development of the oil resistant elastomer by the cross polymerization of butadiene and acrylic acid nitrile a suitable oil resistant abrasive binder has been provided. This material, known commercially as "Perbunan" and "Perbunan Extra" is hereinafter referred to as "Perbunan" and is disclosed in United States Letters Patent 1,973,000.

The polymerization is carried to a point to provide for the making of a material having the desired properties. The material "Perbunan" is resistant to oil and when vulcanized to the hard state has a higher softening point than natural rubber which is treated similarly. It may be easily loaded with fillers and compounding agents and its limits of vulcanization are not as sensitive as in the case of natural rubber. When abrasive particles are bonded with "Perbunan" they have, following vulcanization, a hard bond with a softening point above that of natural rubber. In addition to being oil resistant abrasive wheels and the like made with a bond of "Perbunan" will not be so detrimentally affected by the heat generated during cutting and grinding operations.

Abrasive articles using the "Perbunan" elastomer as a bond may be made by the two general methods: (1) mechanical mixing; (2) solution method. Each of these methods, later to be considered in detail, has its advantages depending upon the type of article to be produced. Thicker articles may be prepared more readily by the solution or solvent method, while thin articles, such as cutting wheels and the like, are prepared more readily by the mechanical mixing method.

In each of the mentioned methods the "Perbunan" is first broken down and compounded with accelerators and vulcanizing agents. The fillers and abrasive are mechanically mixed into the compounded "Perbunan" by the mechanical method. Then the mix is sheeted out to the desired thickness and wheels or discs of other desired shapes cut from the sheets and vulcanized.

With the solution or solvent method the compounded "Perbunan" is dissolved in a solvent until it is in the form of a sticky yet stirrable mass. Abrasive and fillers are then stirred into the mass and after a thorough mixing to uniformly distribute the abrasive through the mass the latter is poured into a desired shape to dry. The mass of "Perbunan" should be maintained at such consistency as to uniformly suspend the abrasive introduced therein. Drying may be carried out in any desired manner and after the solvent has been removed the mass is pressed and sheeted and articles cut therefrom or the mass may be shaped in suitable molds and the like following which the cut or molded or otherwise formed articles are vulcanized.

In practicing the mechanical mixing method of making "Perbunan" bonded abrasive articles it has been found necessary to soften the "Perbunan" stock and to increase its tackiness in order that the mixing may be carried out more readily. The group of chemicals found useful for this purpose are esters and ethers. As examples of softeners which may be used, I cite tricresyl phosphate, dibenzyl ether, phthalic acid esters, and triphenyl phosphate.

For producing tack in the "Perbunan" stock I find that any of rosin oil, thermo-setting resins as phenol aldehyde resins, wood rosin, Coumarone-Indene resins, and coal tar are satisfactory. For certain purposes it is found useful to compound "Perbunan" stock using both tack producing and softening chemicals. However, the smaller the quantity of these agents used the better the tensile properties of the resulting bond in the completed articles. Normally the quantity of these agents may vary from 5 per cent to 20 per cent based on the quantity of "Perbunan" used. Here it is noted that the thermo-setting resins serve to harden the bond in the finished articles.

The quantity of sulfur used with "Perbunan" is similar to that used in connection with the vulcanization of natural rubber. That is the quantity of sulfur used varies from 30 to 60 parts based on the "Perbunan" as one hundred parts. If accelerators are desired, the same accelerators that have heretofore been used with natural rubber have been found satisfactory and they are used with "Perbunan" in substantially the same manner and quantity as with natural rubber.

An important advantage of the use of "Perbunan" in the bonding of abrasive articles resides in the fact that the temperature range in the vulcanization process is not as critical as in the case with natural rubber. That is the abrasive articles may be over vulcanized without the same detrimental effect that results when abrasive articles having a natural rubber bond are over vulcanized. The temperature used in the vulcanization process may vary from 140 degrees centigrade to 190 degrees centigrade.

The vulcanization may be accomplished in any of the following ways: Dry heat vulcanization; vulcanization in a hot press; dry heat vulcanization under several atmospheres of gas pressure and vulcanization in superheated steam at several atmospheres of pressure. The type of vulcanization used in the making of any one article is governed by the character of the article.

In practicing the solution method for the preparation of abrasive articles the "Perbunan" is first compounded on rolls in the manner described when considering the mechanical mixing process or method. The stock is then placed in a suitable container and the proper quantity of solvent added to render the stock a sticky yet stirrable mass of a consistency to uniformly suspend abrasive when added thereto. With the "Perbunan" a large amount of solvent is required.

Thus the ratio is about one part of "Perbunan" to two to four parts of the solvent to produce the desired consistency. Most common rubber solvents are suitable for the present described purpose, hydrocarbon fractions being an exception. The desired consistency of solution having been obtained the abrasive particles are stirred into the mass to uniformly distribute the abrasive therein. Thereafter the material of the mass is shaped, dried to insure removal of the solvent, pressed and vulcanized in any of the ways above suggested.

In following the solution method chemicals to soften the "Perbunan" and to add to its tackiness are not as important as when the mechanical mixing method is being used. However, it is often found desirable to add resins such as phenol aldehyde to obtain the desired quality of hardness in the finished articles. Here it is noted that any small quantities of solvent which may remain in the "Perbunan" abrasive mix, even after long drying, are not as detrimental to the quality of the bond in the completed article as such solvents are where a natural rubber bond is used with the abrasive.

As one specific example of the mechanical mixing method above referred to, I prepare a "Perbunan" bonded abrasive article as follows:

| | Parts |
|---|---|
| Cross polymerized butadiene and acrylic acid nitrile ("Perbunan") | 10 |
| Rosin oil | .5 |
| Tricresyl phosphate | .5 |
| Sulfur | 5 |
| Filler | 24 |
| Aluminum oxide abrasive, size 150 | 60 |

The "Perbunan" is compounded with the rosin oil, the softener (tricresyl phosphate), and the sulfur. The abrasive and filler are then added to the mix by mixing on heavy cold rolls. After thorough mixing the mass is sheeted to the desired thickness and discs or other articles cut therefrom and vulcanized. The mixture above described has been found satisfactory for thin abrasive wheels or discs.

My work with "Perbunan" has shown that when cold rollers are used in the compounding operation there is no sticking of the material on the rolls and that the compounding operation may be continued until a thorough mixing is obtained. However, when hot rollers are used there is a tendency for the material to stick to the rolls. This sticking of the material to the hot rolls may be prevented or avoided by the applying of a slight amount of hydrocarbon oil to the rolls or directly to the material on the rolls as convenience may dictate.

The following materials and proportions are given as one specific example of the making of a "Perbunan" bonded abrasive article by the above described solution method.

| | Parts |
|---|---|
| Cross polymerized butadiene and acrylic acid nitrile ("Perbunan") | 10 |
| Rosin oil | .5 |
| Phenol formaldehyde resin | 2 |
| Sulfur | 5 |
| Acetone | 30 |
| Chloroform | 30 |
| Aluminum oxide abrasive size 46 | 82.5 |

First the "Perbunan," rosin oil, phenol, formaldehyde resin and sulfur are compounded on rolls as above described. The compounded "Perbunan" is then dissolved in the acetone and chloroform and mixed until a smooth mixture is obtained. This mixture is of a consistency to uniformly suspend the abrasive and thereafter the abrasive is stirred into the sticky mass. The mixture is then ready for the shaping, drying and vulcanizing of articles therefrom.

The articles made in accordance with the invention have long useful life and this is particularly true with respect to cutting wheels. The wheels made in accordance with the invention better withstand the high temperatures developed in a cut. This I attribute to the fact that the "Perbunan" bond of the invention is not so detrimentally affected by the heat because of its higher softening point. The wheels are oil resistant and thus do not tend to decompose as readily as natural rubber, when used in a cutting operation requiring the use of an oil and water coolant or requiring the use of an oil coolant.

Having thus set forth the nature of my invention, what I claim is:

1. An abrasive article comprising abrasive particles and a bond containing phenol aldehyde resin and a cross polymer of butadiene and acrylic acid nitrile.

2. An abrasive article comprising abrasive particles and a bond containing a thermo-setting resin and a cross polymer of butadiene and acrylic acid nitrile.

3. The method of making abrasive articles comprising compounding a vulcanizing agent and abrasive particles with a cross polymer of butadiene and acrylic acid nitrile, shaping articles from the mixture thus obtained, and vulcanizing said articles in superheated steam at several atmospheres of pressure.

4. An abrasive article comprising abrasive particles and a bond containing a thermo-plastic resin and a cross polymer of butadiene and acrylic acid nitrile.

5. An abrasive cutting wheel comprising a thin disc of not more than one-eighth inch in thickness and including abrasive grain and a bond securing the grain in the disc, and said bond comprising phenol aldehyde resin and a cross polymer of butadiene and acrylic acid nitrile.

HUGH V. ALLISON.